US005729779A

United States Patent [19]
Oshima

[11] Patent Number: 5,729,779
[45] Date of Patent: Mar. 17, 1998

[54] FILM TRANSPORT SYSTEM WITH ONE MOTOR FOR THE ADVANCED PHOTO SYSTEM CARTRIDGE FILM

[75] Inventor: Shigeru Oshima, Chofu, Japan

[73] Assignee: Arc Design Room Ltd., Tokyo, Japan

[21] Appl. No.: 683,109

[22] Filed: Jul. 16, 1996

Related U.S. Application Data

[63] Continuation of Ser. No. 560,337, Nov. 17, 1995, abandoned.

[51] Int. Cl.⁶ .................................................. G03B 1/00
[52] U.S. Cl. ...................................... 396/418; 396/413
[58] Field of Search .................................. 396/411, 413, 396/418

[56] References Cited

U.S. PATENT DOCUMENTS 4,766,452  8/1988  Ohara et al. ................... 354/173.1
5,437,416  8/1995  Ezawa et al. ................... 354/173.1
5,456,419  10/1995 Ezawa ............................ 354/173.1
5,477,288  12/1995 Miyazaki et al. ................ 354/106
5,512,970  4/1996  Kamoda et al. ................ 354/173.1
5,576,784  11/1996 Tsunefuji et al. ................ 396/418

Primary Examiner—Safet Metjahic
Assistant Examiner—John Chizmar
Attorney, Agent, or Firm—Ladas & Parry

[57] ABSTRACT

A film transport system to be used in cameras for the Advanced Photo System cartridge film, which have one motor for feeding the film out of the cartridge and for taking up the film on the take-up spool, one sun gear with two planet gears in the film driving gear train to switch the direction of film drive between feed and take-up on the one hand and rewind on the other hand. An arc shaped slot receives the axle of the film advance (feed and take-up) planet gear to accommodate differences of speed between feeding and taking up of the film. This avoids the need for a one way clutch and a separate rewind gear train.

9 Claims, 5 Drawing Sheets

FILM TRANSPORT SYSTEM WITH ONE MOTOR FOR THE ADVANCED PHOTO SYSTEM CARTRIDGE FILM

This application is a continuation of application Ser. No. 08/560,337 filed on Nov. 17, 1995, now abandoned.

BACKGROUND OF THE INVENTION

1. Field of the Invention

This invention relates to the film transport system of a camera which accepts the recently developed photographic film and cartridge called the Advanced Photo System (hereinafter referred to as the APS) cartridge film, of which two planet gears provided with a sun gear switch the film driving direction from advance to rewind or from rewind to advance very simply and easily using less gears, and of which the planet gear used for film advance accommodates the speed difference between the feed and take-up of the film without using a complicated mechanism, such as a one-way clutch. FIG. 1 shows the said APS cartridge.

2. Background Art

In the camera which uses the APS cartridge film and has a motor to drive the film, the film in the cartridge is fed out by the rotation of the cartridge driver which is engaged with the axle of cartridge spool, and after the film has reached the take-up spool the rotating, take-up spool takes up the film. The cartridge driver and the take-up spool are rotated respectively at the same time by the motor in a first direction for feeding and taking-up the film.

The circumferential velocity of the take-up spool should be greater than the film feed velocity. (V spool>V feed).

When the film is pulled by the take-up spool, the film makes the cartridge driver rotate faster. The more the film is taken up on the take-up spool, the greater the circumferential velocity of the take-up spool due to the increase of diameter of the film roll taken up on the take-up spool. Then the difference between the circumferential velocity of the take-up spool and the cartridge driver rotation speed must controlled so that the gear train is not jammed.

The cartridge driver is rotated by the motor in the opposite direction from that for rewinding the film.

FIG. 2 shows a typical one motor film transport system for achieving the heretofore explained functions.

When the motor (1) rotates clockwise, the sun gear (2) rotates clockwise, the planet gear arm (3) turns clockwise, the planet gear (4) rotates counterclockwise and engages with the gear (5) fixed on the cartridge driver (6) axle, the cartridge driver rotates clockwise and the film is fed out of the cartridge as shown in the direction of the arrow.

At the same time the take-up spool (7) is rotated respectively by the take-up gear train (8) and takes up the film on the take-up spool. The difference between the circumferential velocity of the take-up spool and the speed of rotation of the cartridge driver is accommodated by a one-way clutch (9).

When the motor rotates in the opposite direction (counterclockwise), the planet gear arm (3) turns counterclockwise, the planet gear is detached from the gear (5) fixed to the cartridge driver, and engages with the first gear (10) of the rewind gear train (11) provided for film rewind, then the cartridge driver and take-up spool rotate also in the opposite direction, counterclockwise, to rewind the film into the cartridge (12) respectively at the same time.

In this example, the rewind gear train and one-way clutch are required.

SUMMARY OF THE INVENTION

In this invention, the one motor film transport system is constructed as described hereinafter to eliminate the rewind gear train saving much space, cost and complication of construction and also eliminate the one-way clutch to save space and cost.

The film transport system of this invention comprises a motor, a cartridge driver, a gear train which includes a sun gear with a planet gear for film advance and another planet gear for film rewind, which are both fixed on a rotating lever arm together with the sun gear, and an arc shaped slot is provided in the lever arm for receiving the axle of the film advance planet gear.

In this invention, as distinguished from the system shown in FIG. 2, a second planet gear is added to the sun gear and the planet gear, and the sun gear now has two planet gears.

One planet gear is used for film advance and the other planet gear is used for film rewind. The sun gear is fixed at the pivot of the rotating lever which has two arms, and on one arm the film advance planet gear is fixed and on the other arm the film rewind planet gear is fixed. Both of the planet gears are always engaged with the sun gear.

When the motor is rotating clockwise, the lever arm of the sun gear with the planet gears rotates clockwise and the film advance planet gear engages with the gear fixed on the cartridge driver axle, and the cartridge driver and the take-up spool rotate at the same time in the same direction, and the film is fed out of the cartridge and taken up on the take-up spool.

When the motor rotates in the opposite direction, counterclockwise, immediately the lever of the sun gear with the planet gears rotates counterclockwise, and the film advance planet gear is detached from the gear fixed on the cartridge driver axle, and instead the film rewind planet gear engages with the same gear. Consequently the gears for the take-up spool and the cartridge driver rotate counterclockwise to rewind the film respectively at the same time.

Thus, this system does not require any special and separately provided gear train for rewinding the film.

As the film is being taken up on the take-up spool, the diameter of the roll of the film progressively increases. The greater the diameter, the higher the take speed of the film (the circumferential velocity of the take-up spool). But the speed of rotation of the cartridge driver can not be as high as the take-up speed of the film, and the difference between the take-up speed of the film and the rotational drive speed of the cartridge must be properly governed or accommodated. In the case of the system shown in FIG. 2, the one-way clutch is used for this purpose.

In the system of this invention, the axle of the film advance planet gear is held in an arc shaped slot, and the axle can slide in the arc shaped slot. When the speed of film take-up is too high relative to the speed of cartridge driver rotation, the film advance planet gear is repelled from the gear fixed on the cartridge driver axle, and at the same time the axle of the film advance planet gear slidably moves in the arc shaped slot in the direction of gear disengagement to help the film advance planet gear be rejected and disengaged from the gear fixed on the cartridge driver axle.

By this axle movement of the film advance planet gear, the film advance planet gear is free from the gear fixed on the cartridge driver axle, and then the film is advanced a pulling force from rotation of the take-up spool only. According, jamming of the gear train caused by a difference between the speed of film take-up and the speed of cartridge driver rotation is avoided.

Thus, the system of this invention does not require the one-way clutch.

These and other objects, advantages and features of the present invention will be more fully understood and appreciated by reference to the drawings and detailed description which follows.

Notations

FIG. 2

Figure 1:
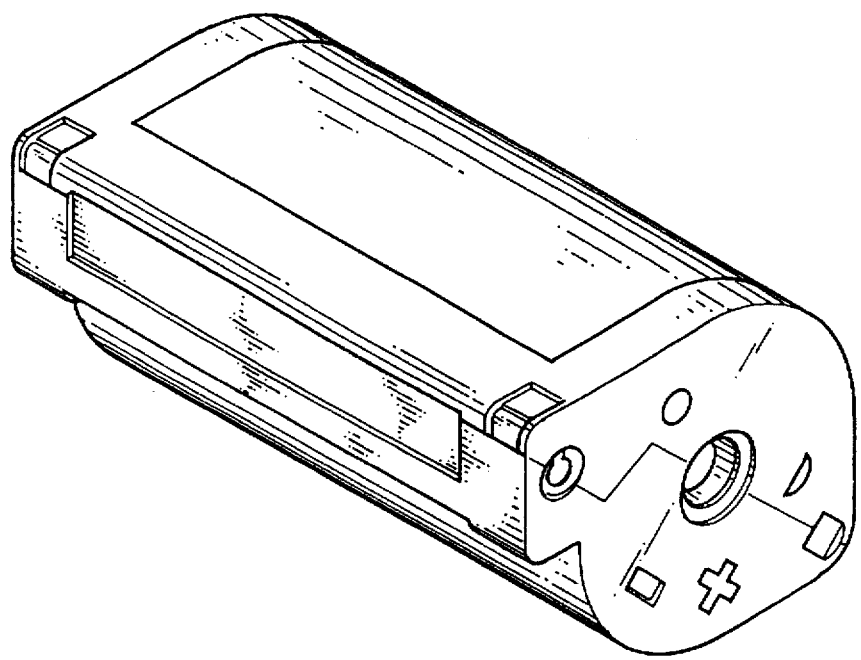
FIG. 1 shows the APS cartridge.
Figure 2:
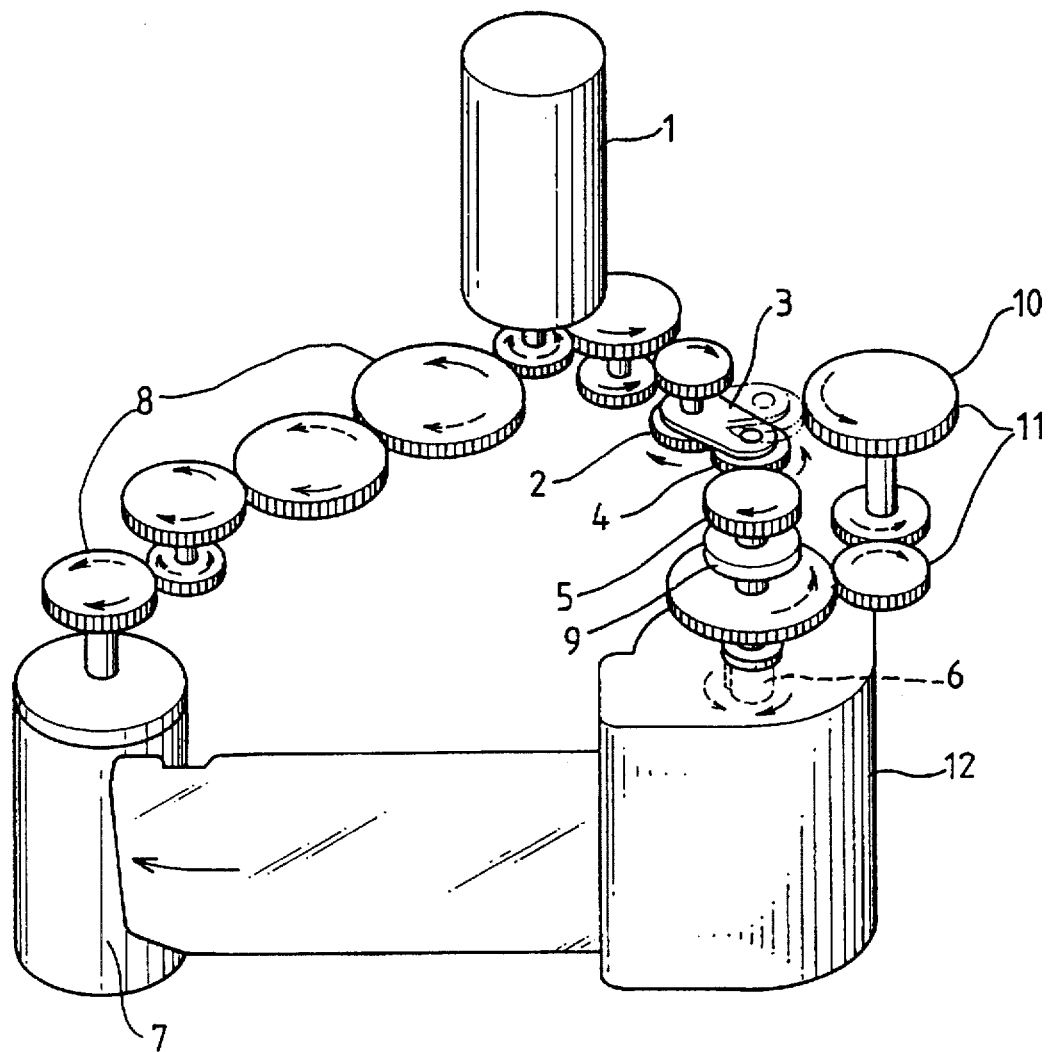
FIG. 2 shows a typical one motor film transport system for the APS cartridge film according to the prior art.

1 Motor
2 Sun gear
3 Planet gear arm
4 Planet gear
5 Gear fixed to the cartridge driver axle
6 Cartridge driver
7 Take-up spool
8 Take-up gear train
9 One-way clutch
10 First gear of the rewind gear train
11 Rewind gear train
12 Cartridge

FIG. 3

13 Motor
14 Cartridge driver
15 Film take-up gear train
16 Film drive gear train
17 Sun gear
18 Planet gear for film advance
19 Planet gear for film rewind
20 Lever arm 21 Arc shaped slot
22 Gear fixed on the cartridge driver
23 Stopper
24 Take-up spool
25 Cartridge

FIGS. 4A–4E

26 Motor
27 Take-up spool
28 Motor gear
29 Gear fixed on the cartridge driver
30 Cartridge driver
31 Gear train
32 Sun gear
33 Planet gear for film advance
34 Planet gear for film rewind
35 Bearing hole
36 Planet gear arm
37 Arc shaped slot bearing

DETAILED DESCRIPTION OF THE INVENTION

Figure 3:
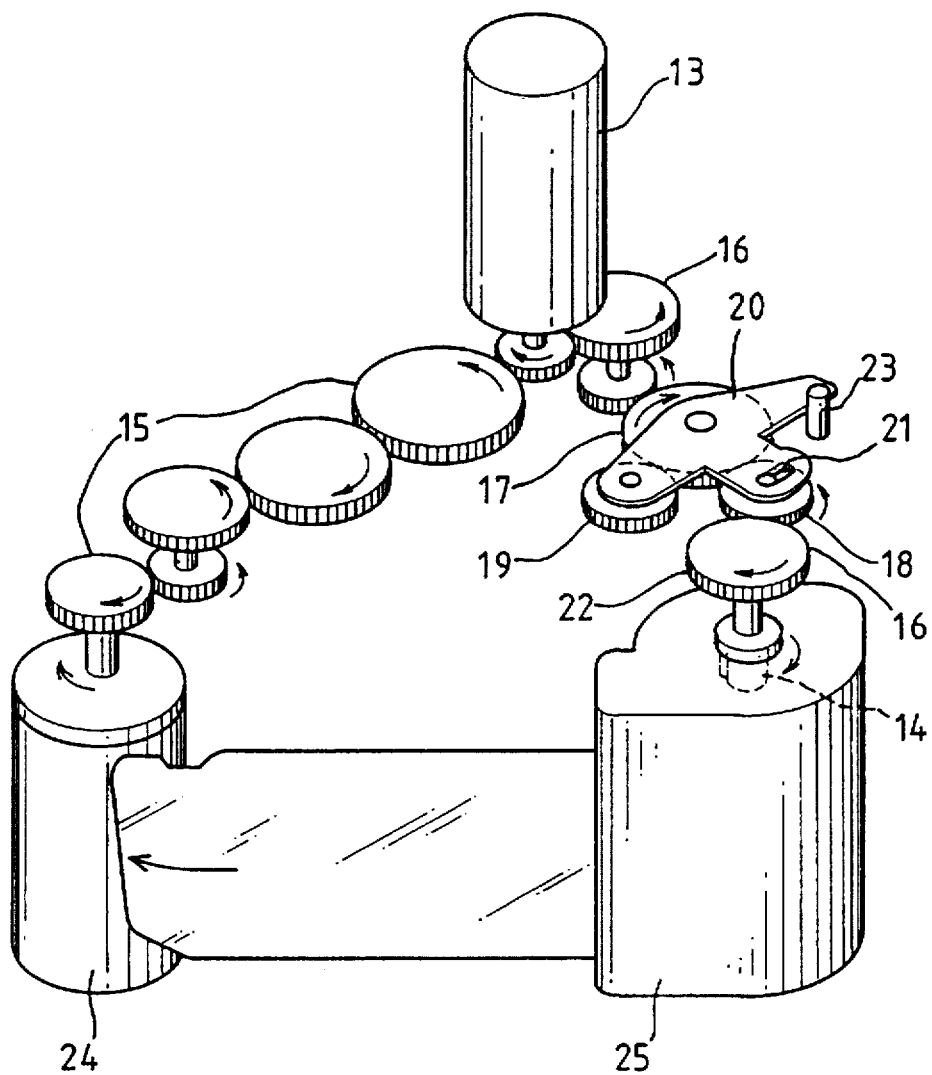
FIG. 3 shows the film transport system of the invention.

FIG. 3 shows the film transport system of this invention for the APS cartridge film which comprises a motor (13), a cartridge driver (14), a film take-up gear train (15), a film drive gear train (16) which includes a sun gear (17) with a planet gear (18) for film advance and another planet gear (19) for film rewind, which are both fixed on a lever arm (20) together with the sun gear, an arc shaped slot (21) for the axle of the film advance planet gear and a gear (22) fixed on the cartridge driver axle.

When the motor (13) rotates clockwise, the sun gear (17) rotates clockwise. When the sun gear (17) starts rotating clockwise, immediately the planet Gear lever arm (20) on which the planet gears (18 & 19) are fixed also rotates clockwise, and the film advance planet gear (18) rotates counterclockwise and engages with the gear (22) fixed On the cartridge driver axle. At this time, the movement of planet gear arm (20) is halted at the stopper (23) so that the arm does not move further clockwise. Then the gear (23) fixed on the cartridge driver axle rotates clockwise. Thus the film is fed out of the cartridge. At the same time, the film take-up gear train (15) transmits the clockwise rotation of the motor to the take-up spool (24) and it rotates clockwise and takes the film up on the take-up spool (24).

When the speed of film take-up is too high to keep the proper balance with the speed of cartridge driver (14) rotation, the film advance planet gear (18) is separated from the gear (22) fixed on the cartridge driver axle because of the difference between the speed of film take-up and the speed of cartridge driver rotation (Take-up>Cartridge driver) and at the same time the axle of the film advance planet gear (18) slidably moves in the arc shaped slot (21) in the direction of gear disengagement. When the said axle moves in the arc shaped slot (21), the planet gear arm (20) stays at the stopped position by the stopper (23) because the sun gear (17) keeps rotating clockwise, and the axle can move freely in the arc slot without any disturbing pressure caused by further clockwise movement of the lever arm.

Thus the imbalance caused by the difference of speed between the cartridge driver axle and the film take-up can be properly adjusted without a one-way clutch.

When the motor (13) rotates counterclockwise, the sun gear (17) rotates counterclockwise. When the sun gear (17)

starts rotating counterclockwise, the planet gear arm (20) also immediately rotates counterclockwise, and the film rewind planet gear (19) rotates clockwise and engages with the gear (22) fixed on the cartridge driver axle.

Then the gear fixed on the cartridge driver axle rotates counterclockwise. Thus the film is rewound into the cartridge (25). At the same time, the film take-up gear train (15) transmits the counterclockwise rotation of the motor to the take-up spool (24) and it rotates counterclockwise so that the film from the take-up spool can be pulled out of the take-up spool.

FIGS. 4A to 4E show an embodiment of the film transport according to the invention.

Figure 4A:
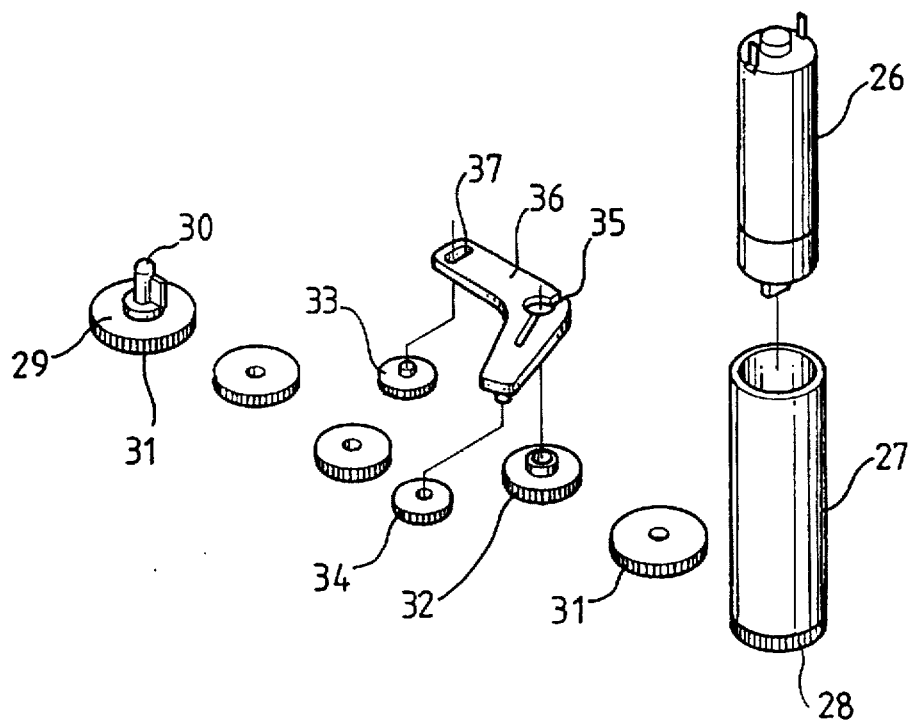
FIG. 4A is an exploded view of an embodiment of a portion of the film transport system.

FIG. 4A shows a motor (26) which includes a reduction gear system therein. The motor (26) is placed in the take-up spool (27) on which the motor gear (28) is fixed. From the motor gear (28) to the gear (29) fixed on the cartridge driver (30), a gear train (31) is provided to transmit motor gear rotation to the cartridge driver. In the gear train, the sun gear (32) and the planet gear (33) for film advance and the planet gear (34) for film rewind are included. The axle of the sun gear is held in the bearing hole (35) provided at the pivot of the planet gear arm (36), and the bearing hole has a slot which functions as a spring and provides a certain amount of friction between the axle of the sun gear and the bearing hole. If the sun gear rotates counterclockwise, the planet gear arm (36) also rotates counterclockwise because of the friction between the sun gear axle and the bearing hole until the other end of the planet gear arm hits the stopper, which is, in this case, the wall provided in the camera body (refer to FIG. 4B). Receiving the axle of the film advance planet gear, is arc shaped slot (37).

Figure 4B:
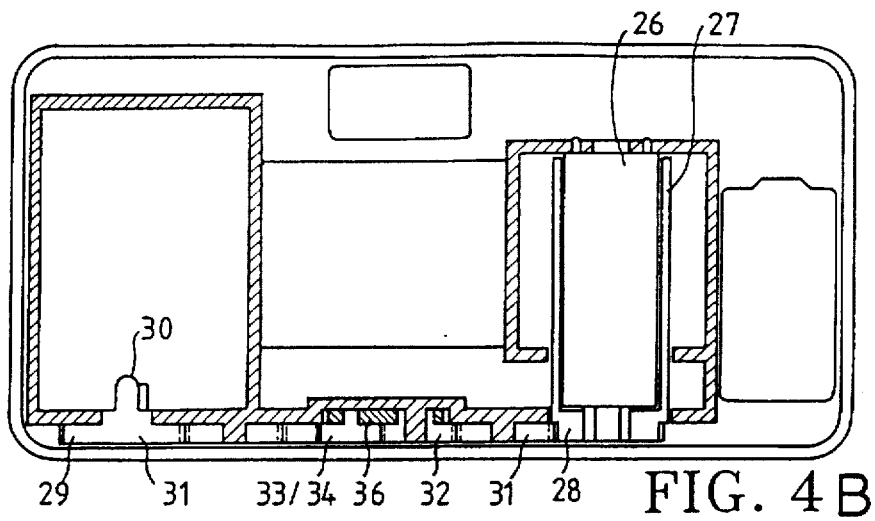
FIG. 4B is a sectional view through a camera containing the gear system of the invention.

FIG. 4B shows the motor (26) with the reduction gear system, the take-up spool (27), the motor gear (28), the gear (29) fixed on the cartridge driver (30), the gear train (31), the sun gear (32), the planet gear (33) for film advance, the planet gear (34) for film rewind, and the bearing hole (35) at the pivot of the planet gear arm (36). The planet gear arm (36) is placed in a recessed part of the gear train (31).

Figure 4C:
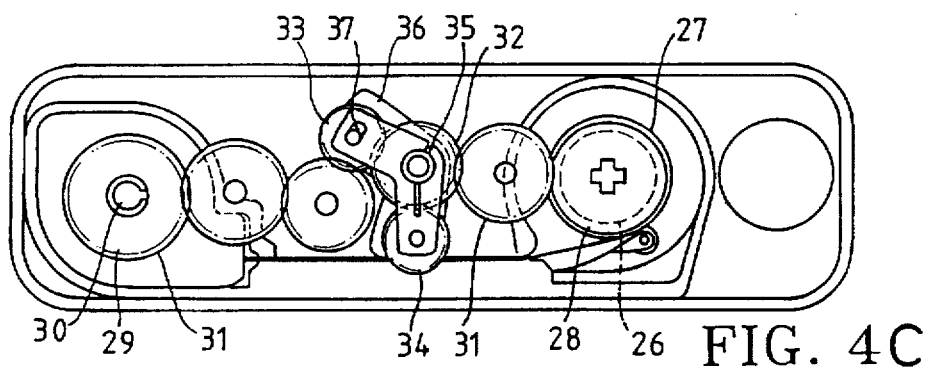
FIG. 4C shows the gear system in a state in which the motor rotates counterclockwise, the film is being fed out of the cartridge, but the fed take-up of the film has just started and there is no imbalance between the speed of rotation of the cartridge axle and the film take-up.

FIG. 4C shows the system in the state in which the motor rotates counterclockwise, the film is being fed out of the cartridge, but the taking up of the film has just started and there is no imbalance between the speed of cartridge axle rotation and film take-up. The motor (26) rotates counterclockwise and the sun gear (32) rotates counterclockwise. Due to the friction which exists between the axle of the sun gear and the bearing hole (35) provided at the pivot of the planet gear arm (36), the planet gear arm turns counterclockwise, and the film advance planet gear (33) engages with the gear train (31) which transmits rotation to the gear (29) fixed on the cartridge driver (30) so that the cartridge driver rotates counterclockwise, causing the film to be fed out of the cartridge. At the same time, the take-up spool (27) also rotates counterclockwise by the motor, and the film fed out of the cartridge is taken up on the take-up spool. At the stage in FIG. 4C, the film taken up on the take-up spool is not great, and the diameter of the film roll is not large, and the rotation speed of the cartridge driver and the speed of taking-up of the film are properly balanced and a jam of the gear train does not occur. Consequently the film advance planet gear is still engaging the gear train.

Figure 4D:
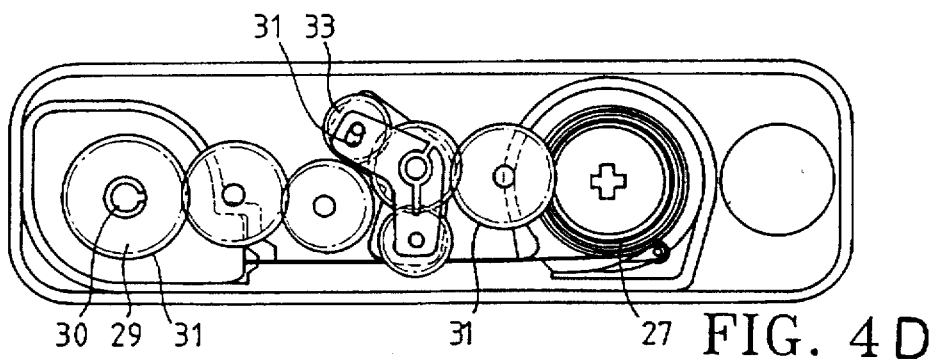
FIG. 4D shows the system when the diameter of the roll of film taken up on the take-up spool has increased and the difference in the speed between the cartridge axle rotation and the film take-up is now great so that the film advance planet gear is rejected from the gear train, and the axle of the film advance planet gear has moved in an arc shaped slot in the direction of gear disengagement, and the film being advanced only by a pulling force due to take-up spool rotation.

FIG. 4D shows the state in which the diameter of the roll of film taken up on the take-up spool (27) has increased, and the difference of the speed of rotation between the cartridge driver (30) and the film take-up is now great. The speed of taking up the film is higher than the speed of rotation of the cartridge driver. This difference between the speeds tries to increase the rotation speed of the cartridge driver, but the cartridge driver speed of rotation is governed by the gear train (31) engaged with the film advance planet gear (33). The force of the take-up film tries to outcome the force of the gear train which governs the speed of cartridge driver rotation, and the cartridge driver rotation force does the same against the force of taking up the film. Consequently, unless one of the gears in the gear train disengages from the gear train, all the gears are jammed. In the system of the invention, the axle of the film advance planet gear is held in the arc shaped slot (37), and the axle can move in the slot. At the moment when the interference between the film take-up and the cartridge driver rotation starts, all the gears receive the force of the interference. Since the axle of the film advance planet gear is not fixed in place and can move in the arc shaped slot, this film advance planet gear is repelled from the gear train by movement of its axle in the arc shaped slot. Thereafter, the rotation of the sun gear is not transmitted to the cartridge driver, and the cartridge axle rotates only by the pulling force from the take-up spool rotation, and only the rotation of the take-up spool takes up the film over the take-up spool. Thus the gears are not jammed.

Figure 4E:
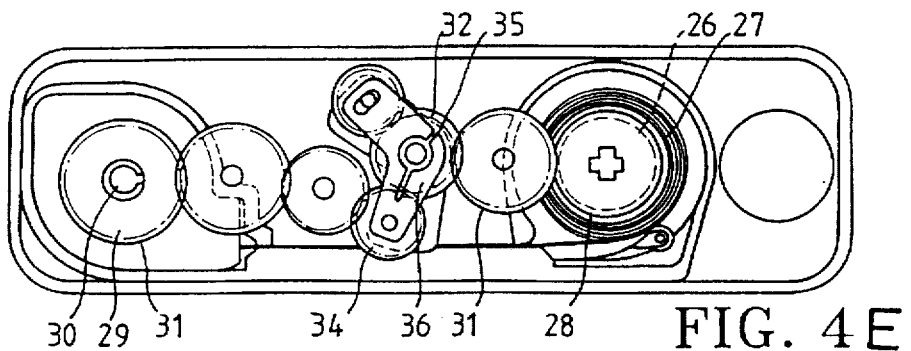
FIG. 4E shows the system when the motor is rotating clockwise and the rewind planet gear is engaged through the gear train with the gear fixed on the cartridge driver axle, and the cartridge axle and the take-up spool are rotating clockwise to rewind the film.

FIG. 4E shows the state of the system when the motor is rotating clockwise and the rewind planet gear is engaged with gear train (31) which transmits the rotation to the gear (29) fixed on the cartridge driver (30) and the cartridge axle is rotating clockwise to rewind the film. The motor (26) rotates clockwise and the sun gear (32) rotates clockwise. Due to the friction which exists between the axle of the sun gear and the bearing hole (35) provided at the pivot of the planet gear arm (36), the planet gear arm (36) turns clockwise, and the film rewind planet gear (34) engages with the gear train (31) which transmits the rotation to the gear (29) fixed on the cartridge driver (30) so that the cartridge driver rotates clockwise, and the film is rewound into the cartridge. At the same time, the take-up spool (27) also rotates clockwise by the motor, however the tip of the film can be fixed by friction to the take-up spool spindle only when the take-up spool rotates counterclockwise, so in the case of clockwise rewind rotation, the tip of the film detaches from the take-up spool spindle and even though the take-up spool rotates faster than the rewind gear train rotation speed, the film tip slips on the spindle surface, and the film is not forced to run at higher speed than the cartridge driver rotation, and the film is not jammed.

What is claimed is:

1. A film transport system for an Advanced Photo System cartridge which can transport film in advance and rewind directions, without a rewind gear train, and accommodate differences between the velocity of a cartridge driver for film feed and the circumferential velocity of a film take-up spool, said film transport system comprising:

a motor drivable in opposite directions; and a film driving gear train including a sun gear driven by said motor, a first planet gear for film advance, a second planet gear for film rewind, and a pivotable lever supporting said sun gear and said first and second planet gears, said pivotable lever having an arc-shaped slot slidably receiving an axle of said first planet gear, said lever being pivotable in response to direction of drive of said motor to selectively and drivingly engage said first and second planet gears respectively with said cartridge driver.

2. A film transport system as claimed in claim 1, comprising a gear train drivingly connecting said motor and said take-up spool.

3. A film transport system as claimed in claim 1, wherein said first planet gear is in driving engagement with said cartridge driver during film advance, said axle of said first planet gear being movable in said slot to permit disengagement of said first planet gear from said cartridge driver when the rotational velocity of said cartridge driver and said circumferential velocity of said take-up spool are different.

4. A film transport system as claimed in claim 1, wherein said pivotable lever has a hole frictionally engaging an axle of said sun gear.

5. A film transport system as claimed in claim 4, wherein said pivotable lever has a slot extending from said hole in said pivotable lever to a periphery of the lever to provide spring engagement of said lever on said axle of said sun gear.

6. A film transport system as claimed in claim 1, comprising a stopper means for limiting pivotal movement of said lever when said first planet gear is drivingly engaged with said cartridge driver.

7. A film transport system as claimed in claim 1, wherein said pivotable lever has two arms, each supporting a respective one of said planet gears.

8. A film transport system as claimed in claim 1, wherein when said motor is driven in a direction to rewind the film, said second planet gear is engaged with the cartridge driver and said first planet gear is disengaged from said cartridge driver.

9. A film transport system as claimed in claim 1, wherein both said first and second planet gears are engaged with said sun gear in both directions of drive of said motor.

* * * * *